United States Patent
Yano (10) Patent No.: US 8,938,117 B2
(45) Date of Patent: Jan. 20, 2015

(54) PATTERN RECOGNITION APPARATUS AND METHOD THEREFOR CONFIGURED TO RECOGNIZE OBJECT AND ANOTHER LOWER-ORDER OBJECT

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/318,471

(22) PCT Filed: May 6, 2010

(86) PCT No.: PCT/JP2010/003106
§ 371 (c)(1),
(2), (4) Date: Nov. 1, 2011

(87) PCT Pub. No.: WO2010/131435
PCT Pub. Date: Nov. 18, 2010

(65) Prior Publication Data
US 2012/0063674 A1    Mar. 15, 2012

(30) Foreign Application Priority Data
May 11, 2009   (JP) ................................ 2009-114897

(51) Int. Cl.
G06K 9/62    (2006.01)
G06K 9/68    (2006.01)
G06K 9/00    (2006.01)

(52) U.S. Cl.
CPC .......... G06K 9/6857 (2013.01); G06K 9/00221 (2013.01)
USPC ............ 382/159; 382/118; 382/190; 382/103

(58) Field of Classification Search
CPC .......... G06K 9/00221; G06K 9/00281; G06K 9/00248
USPC .................................. 382/159, 118, 190, 103
See application file for complete search history.

(56) References Cited

U.S. PATENT DOCUMENTS 7,567,715 B1 * 7/2009 Zhu et al. .................... 382/232
2002/0018071 A1 * 2/2002 Ohnishi et al. .............. 345/643

(Continued)

FOREIGN PATENT DOCUMENTS

CN   1477588 A   2/2004
CN   1839410 A   9/2006

(Continued)

OTHER PUBLICATIONS

Constantine Papageorgiou and Tomaso Poggio, "A Trainable System for Object Detection", International Journal of Computer Vision 38(1), 15-33, 2000.*

(Continued)

Primary Examiner — Stephen R Koziol
Assistant Examiner — Shaghayegh Azima
(74) Attorney, Agent, or Firm — Canon U.S.A., Inc. IP Division (57) ABSTRACT

In a pattern recognition apparatus, a characteristic amount calculation unit calculates a characteristic amount for recognizing a desired object from a partial image clipped from an input pattern, a likelihood calculation unit calculates a likelihood of an object as a recognition target from the characteristic amount calculated by the characteristic amount calculation unit by referring to an object dictionary, and an object determination unit determines whether the partial image is the object as the recognition target based on the likelihood of the object calculated by the likelihood calculation unit. The likelihood calculation unit calculates the likelihood of the object as the recognition target from the characteristic amount calculated by the characteristic amount calculation unit by referring to a specific object dictionary. The object determination unit determines whether the partial image is a specific object as the recognition target from the likelihood of the object calculated by the likelihood calculation unit.

5 Claims, 9 Drawing Sheets

(56) References Cited

U.S. PATENT DOCUMENTS

| | | | |
|---|---|---|---|
| 2002/0191818 A1* | 12/2002 | Matsuo et al. | 382/118 |
| 2006/0115157 A1* | 6/2006 | Mori et al. | 382/190 |
| 2006/0204079 A1 | 9/2006 | Yamaguchi | |
| 2006/0269143 A1* | 11/2006 | Kozakaya | 382/218 |
| 2007/0276776 A1* | 11/2007 | Sagher et al. | 706/25 |
| 2008/0024620 A1* | 1/2008 | Yoshida et al. | 348/222.1 |
| 2008/0273766 A1* | 11/2008 | Kim et al. | 382/118 |
| 2008/0304699 A1* | 12/2008 | Yuasa | 382/100 |
| 2009/0027732 A1* | 1/2009 | Imai | 358/3.27 |
| 2009/0087099 A1* | 4/2009 | Nakamura | 382/190 |
| 2009/0196467 A1* | 8/2009 | Okubo | 382/118 |
| 2010/0007665 A1* | 1/2010 | Smith et al. | 345/473 |
| 2010/0008547 A1* | 1/2010 | Yagnik et al. | 382/118 |
| 2010/0123772 A1* | 5/2010 | Kawakami et al. | 348/51 |
| 2010/0177957 A1* | 7/2010 | Ogawa | 382/160 |
| 2010/0296702 A1* | 11/2010 | Hu | 382/103 |

FOREIGN PATENT DOCUMENTS

| | | |
|---|---|---|
| JP | 11-085955 A | 3/1999 |
| JP | 2005-056387 A | 3/2005 |
| JP | 2005-056387 A | 3/2005 |
| JP | 2005-250712 A | 9/2005 |
| JP | 2006-023798 A | 1/2006 |
| JP | 2006-079382 A | 3/2006 |
| JP | 2006-243849 A | 9/2006 |
| JP | 2007-115109 A | 5/2007 |
| JP | 2008-11202 A | 1/2008 |
| JP | 2008-243093 A | 10/2008 |
| JP | 2009-080522 A | 4/2009 |
| WO | 2006/047138 A2 | 5/2006 |
| WO | 2008/073416 A1 | 6/2008 |

OTHER PUBLICATIONS

Yang et al, "Detecting Faces in Images: A Survey", IEEE Transactions on Pattern Analysis and Machine Intelligence, vol. 24, No. 1, Jan. 2002.

Viola and Jones, "Rapid Object Detection using Boosted Cascade of Simple Features", Proceedings of the IEEE Conference on Computer Vision and Pattern Recognition (CVPR'01).

* cited by examiner

PATTERN RECOGNITION APPARATUS AND METHOD THEREFOR CONFIGURED TO RECOGNIZE OBJECT AND ANOTHER LOWER-ORDER OBJECT

TECHNICAL FIELD

The present invention relates to a pattern recognition apparatus and a method therefor configured to recognize a predetermined object based on an input pattern and further recognize a specific object whose order is lower than an order of the predetermined object.

BACKGROUND ART

An image processing method for detecting a specific object pattern based on an image can be utilized in detecting a face of a person. Accordingly, the image processing method can be used in various occasions and technological fields, such as a teleconference, a man-machine interface, a security system, and a monitoring system that tracks a face of a person.

To detect a face of a person in an image, a method discussed in Yang et al, "Detecting Faces in Images: A Survey", IEEE TRANSACTIONS ON PATTERN ANALYSIS AND MACHINE INTELLIGENCE, VOL. 24, No. 1, JANUARY 2002 can be used, for example. This method detects a face of a person based on a few remarkable characteristics (e.g., the eyes, the mouse, the nose of a person's face) and a geometrical positional relationship among the characteristics.

In addition, Yang et al, "Detecting Faces in Images: A Survey", IEEE TRANSACTIONS ON PATTERN ANALYSIS AND MACHINE INTELLIGENCE, VOL. 24, No. 1, JANUARY 2002 discusses a method for detecting a face of a person based on a symmetrical characteristic of a person's face and a characteristic of a color of a face of a person and by utilizing a template matching method and a neural networking method.

In recent years, a method is desired capable of identifying and recognizing a specific person based on a detected face of a person in addition to simply detecting a person's face. More specifically, if a specific person can be identified and recognized from an image of a plurality of persons have been captured, an application for recognizing a face of a person captured in the image by using a camera and configured to execute appropriate exposure and focus control according to the recognized face can execute control appropriate for the specific person.

However, recognition of a person's face and a specific person's face cannot be easily implemented for the present. More specifically, Japanese Patent Application Laid-Open No. 2007-115109 discusses a method that recognizes a person's face based on a characteristic of the color of the skin of the person, acquires a focused area of the recognized face, and recognizes the face of a specific person based on a location of the acquired focused area which is used as a characteristic amount.

This method separately executes recognition of a person's face and recognition of a specific person's face. If processing for recognizing the specific person's face in an image is simply used in combination, it becomes necessary to calculate a characteristic amount and execute face recognition in each processing. Accordingly, in this case, it is necessary to execute complicated processing.

The above described problem generally arises not only in executing the face recognition and the recognition of the specific person's face in combination but also in executing recognition of an object in an upper order and another object in a lower order in combination.

In other words, it is desired that a face recognition application is capable of recognizing a lower order object, such as a specific person's face, after recognizing an upper order object, such as a face of a person.

Further, for an application that searches for an image of an animal by recognizing an image of an animal from among a vast amount of images, it is desired to search for an image of a dog, which belongs to a category lower than the category of the animal image. In addition, for a car navigation application that recognizes and highlights a traffic sign and a signboard captured in a video of a scene of a running car, it is desired to identify and highlight a specific signboard.

CITATION LIST

Patent Literature

PTL 1: Japanese Patent Application Laid-Open No. 2007-115109

Non Patent Literature

NPL 1: Yang et al, "Detecting Faces in Images: A Survey", IEEE TRANSACTIONS ON PATTERN ANALYSIS AND MACHINE INTELLIGENCE, VOL. 24, No. 1, JANUARY 2002

NPL 2: Viola and Jones, "Rapid Object Detection using Boosted Cascade of Simple Features", Proceedings of the IEEE Conference on Computer Vision and Pattern Recognition (CVPR'01)

SUMMARY OF INVENTION

The present invention is directed to a pattern recognition apparatus capable of implementing recognition of an upper order category object and recognition of a specific object that belongs to a lower order category with a simple configuration.

According to an aspect of the present invention, a pattern recognition apparatus includes a characteristic amount calculation unit configured to calculate a characteristic amount of an input pattern, an object dictionary generated based on a distribution of a characteristic amount of predetermined objects, a specific object dictionary generated based on a distribution of a characteristic amount of a specific object among the predetermined objects, a first likelihood calculation unit configured to calculate a first likelihood as to whether the input pattern is of the predetermined object based on the characteristic amount calculated by the characteristic amount calculation unit by referring to the object dictionary, a first object determination unit configured to determine whether the input pattern is of the predetermined object based on the first likelihood, a second likelihood calculation unit configured, if it is determined by the first object determination unit that the input pattern is of the predetermined object, to calculate a second likelihood as to whether the input pattern is of the specific object based on the characteristic amount calculated by the characteristic amount calculation unit by referring to the specific object dictionary, and a second object determination unit configured to determine whether the input pattern is of the specific object based on the second likelihood.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF EMBODIMENTS

Various exemplary embodiments, features, and aspects of the invention will be described in detail below with reference to the drawings.

Figure 1:
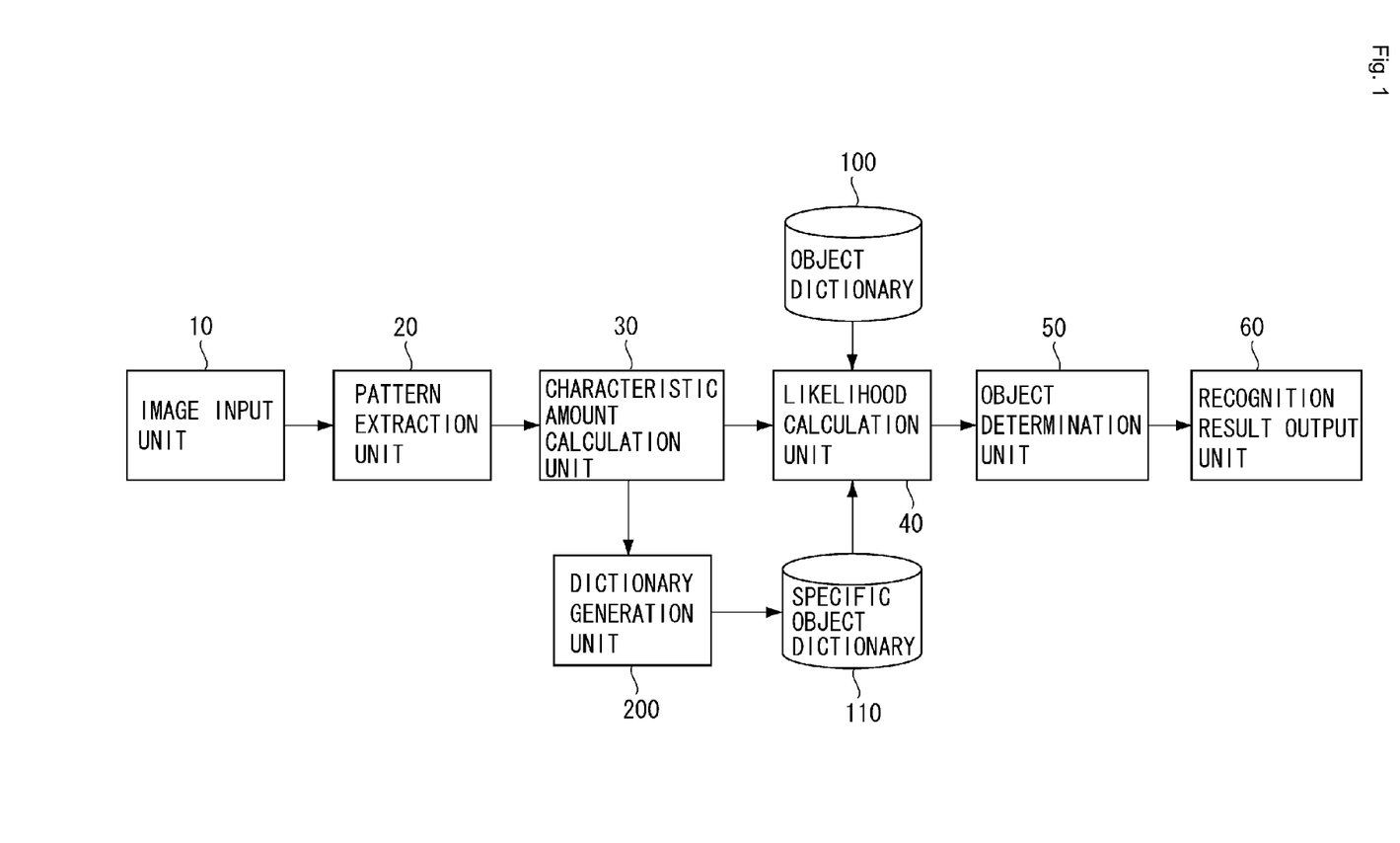
FIG. 1 illustrates an exemplary configuration of a pattern recognition apparatus.

FIG. 1 is a block diagram illustrating an exemplary configuration of a pattern recognition apparatus according to an exemplary embodiment of the present invention.

Referring to FIG. 1, the pattern recognition apparatus includes an image input unit 10, a pattern extraction unit 20, a characteristic amount calculation unit 30, a likelihood calculation unit 40, an object determination unit 50, a recognition result output unit 60, an object dictionary 100, a specific object dictionary 110, and a dictionary generation unit 200.

The image input unit 10 acquires data of an image captured by an imaging unit (not illustrated) of a camera. The pattern extraction unit 20 clips a partial image which is to be subjected to pattern recognition from the image data acquired by the image input unit 10.

The characteristic amount calculation unit 30 calculates a characteristic amount which is used for recognizing a desired object from the partial image clipped by the pattern extraction unit 20. The likelihood calculation unit 40 calculates a likelihood of an object which is a target of recognition based on the characteristic amount calculated by the characteristic amount calculation unit 30.

The object determination unit 50 determines whether the partial image clipped by the pattern extraction unit 20 is an object to be recognized based on the likelihood of the object calculated by 40.

The recognition result output unit 60 outputs a result of the recognition by the object determination unit 50. More specifically, if it is determined by the object determination unit 50 that the recognized object is the desired object, then the recognition result output unit 60 displays an area of the partial image on a display of the pattern recognition apparatus in a manner that the partial image area can be identified from other image areas.

The object dictionary 100 and the specific object dictionary 110 store a characteristic of a desired recognition target object used by the likelihood calculation unit 40 in calculating the likelihood. The object dictionary 100 can be previously produced based on patterns of a plurality of objects by machine learning.

The dictionary generation unit 200 generates the specific object dictionary 110 which is used for recognizing a specific object based on the characteristic amount calculated by the characteristic amount calculation unit 30. An operation of each of these units is controlled by a control unit (not illustrated) of the pattern recognition apparatus.

Now, an operation of the pattern recognition apparatus having the configuration described above will be described in detail below. The pattern recognition apparatus executes the following operations:

(1) recognition of a predetermined object by using a previously stored object dictionary;

(2) setting for executing recognition of a specific object which belongs to a lower order category; and (3) recognition of a specific object belonging to a lower order category.

Now, the above described item operation (1), i.e., recognition of a predetermined object, will be described in detail below.

Figure 2:
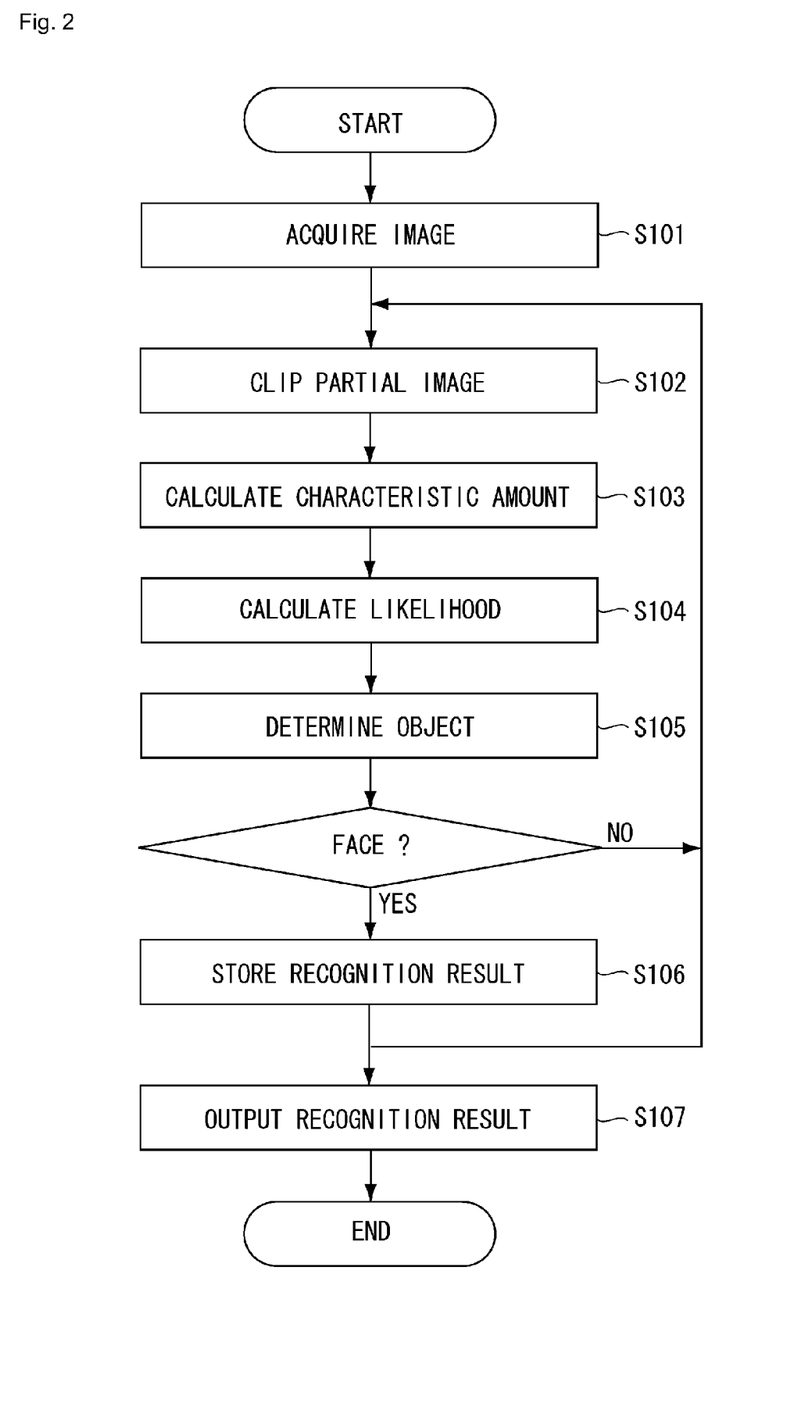
FIG. 2 is a flow chart illustrating an exemplary processing flow of a method for recognizing a predetermined object.

FIG. 2 is a flow chart illustrating an exemplary processing flow of a method for recognizing a predetermined object by using the previously stored object dictionary. In the present exemplary embodiment, a method for recognizing a person's face in an image will be described.

Referring to FIG. 2, in step S101, the image input unit 10 acquires data of an image captured by an imaging unit (not illustrated). The image data includes two-dimensionally arranged data including 8-bit pixels. The image data includes red (R), green (G), and blue (B) (RGB) image planes.

More specifically, the image input unit 10 converts RGB image data into luminance image data. The luminance image data is stored on an image memory (not illustrated) and is used in subsequent processing. If YUV image data is acquired as the image data, it is also useful if a Y component is used as luminance data as it is.

Figure 3:
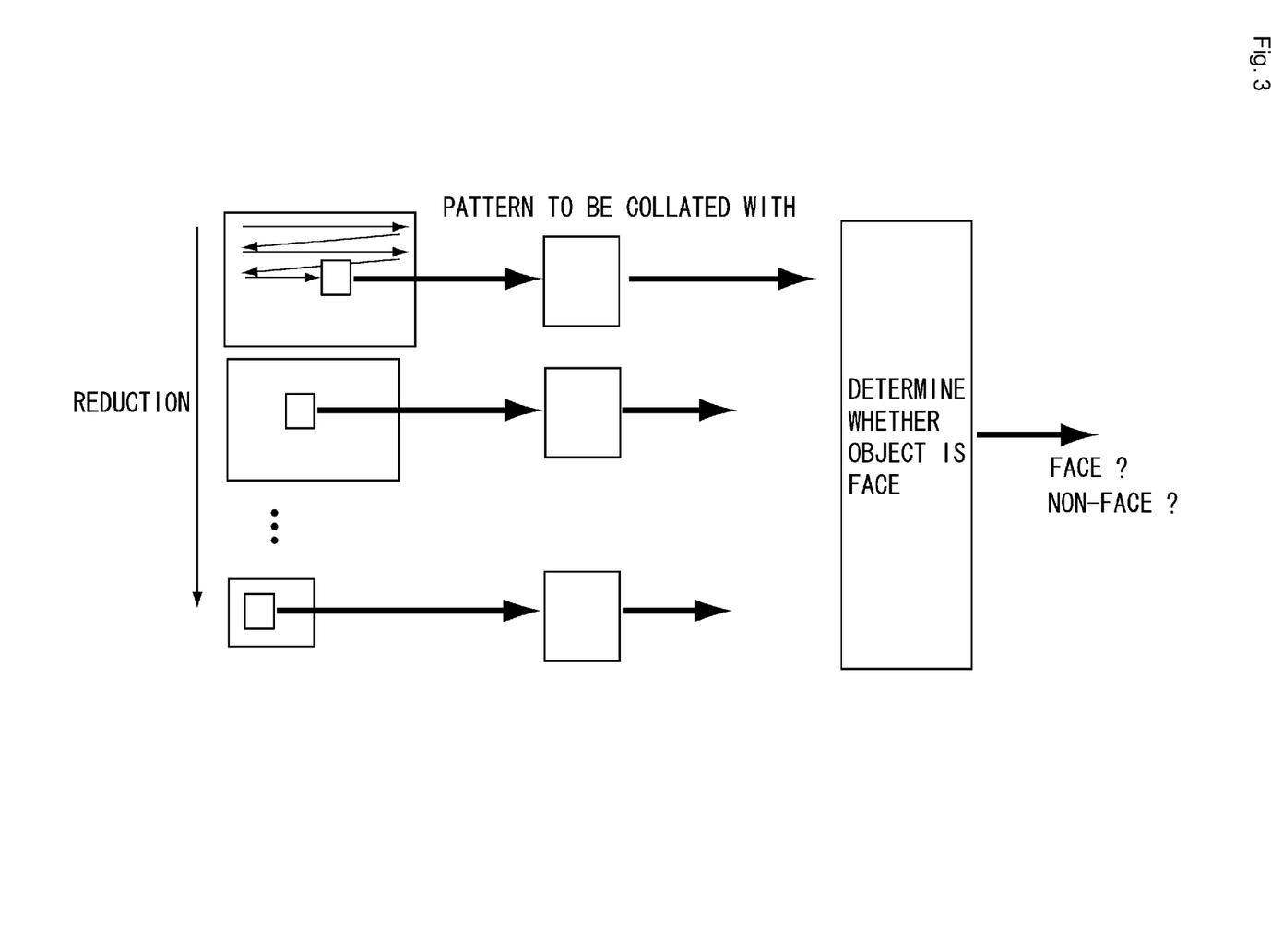
FIG. 3 illustrates an example of a method for searching an image for a face pattern.

In step S102, the pattern extraction unit 20 loads the image data acquired in step S101 from the image memory and clips a partial image which is a target area of object recognition from the image data. More specifically, in step S102, the pattern extraction unit 20 scans an entire image serially in vertical and horizontal directions, as illustrated in FIG. 3. Thus, the pattern extraction unit 20 detects a person's face from the image data and determines a location (range) of clipping.

Further, in order to detect faces of different sizes, it is also useful if the loaded image data is serially reduced by predetermined reduction ratios and scan the image for face detection in the above described manner as illustrated in FIG. 3. The partial image clipped by the above described processing becomes a target of determination as to whether the image includes a person's face in recognition executed in a later stage.

In step S103, the characteristic amount calculation unit 30 calculates a characteristic amount which is used for recognizing a desired object from the partial image clipped by the pattern extraction unit 20. For the characteristic amount used for recognizing a person's face, a characteristic of a face, such as a ratio of a distance between eyes to a height (distance) from a mouse to the eyes, can be used.

Figure 4:
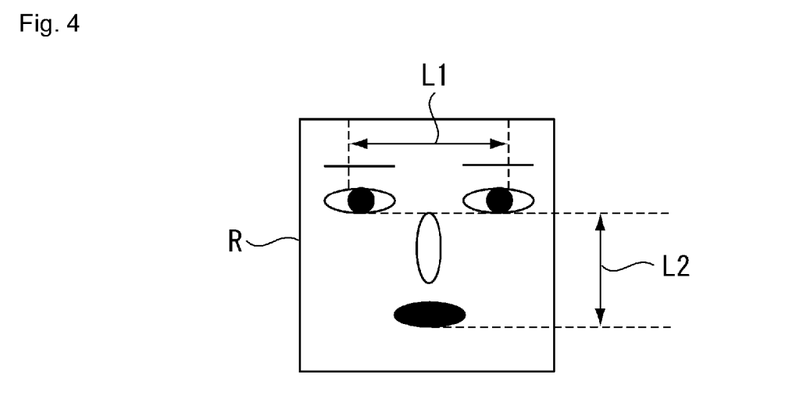
FIG. 4 illustrates an example of characteristic amount of a person's face.

A method for acquiring the ratio of the distance between the eyes to the distance from a mouse to the eyes is described with reference to FIG. 4. The characteristic amount calculation unit 30 extracts three portions whose luminance is darker than the luminance of surrounding portions from a partial image R which has been clipped by the pattern extraction unit 20 as candidates of the eyes and the mouse as illustrated in FIG. 4. Further, the characteristic amount calculation unit 30 calculates a distance between the eyes L1 and a distance from the eyes to the mouse L2 (FIG. 4). In addition, the characteristic amount calculation unit 30 calculates a characteristic amount f for face identification by the following expression (1):

$$f = L1/L2 \qquad \text{[Math. 1]}$$

In the example illustrated in FIG. 4, the partial image R is an image of a person's face (face image). However, if the partial image R is not a face image, the characteristic amount calculation unit 30 executes the extraction of the three portions for the candidates of the eyes and the mouse and the calculation of the characteristic amount f.

In addition, by using a combination of a plurality of characteristic amounts indicating a person's face, recognition of a person's face can be executed at high accuracy. More specifically, it is also useful if a conventional method for using a plurality of characteristic amounts in combination, which is discussed by Viola and Jones, "Rapid Object Detection using Boosted Cascade of Simple Features", Proceedings of the IEEE Conference on Computer Vision and Pattern Recognition (CVPR'01), is used. In this conventional method, six thousand or more characteristic amounts indicating a contrast of brightness in a specific area are used in combination.

In step S104, the likelihood calculation unit 40 calculates the likelihood of an object that is the target of the recognition based on the characteristic amount calculated by the characteristic amount calculation unit 30 and by using the object dictionary 100.

The object dictionary 100 (in the present exemplary embodiment, the object dictionary 100 is a dictionary including data of faces of persons) previously stores the likelihood corresponding to a value of the characteristic amount f (a value indicating the likelihood of a partial image including a person's face) as a table. In the present exemplary embodiment, the likelihood calculation unit 40 determines a bin of the table to refer to based on the value of the characteristic amount f and calculates a value stored in the determined bin as the likelihood.

Figure 5:
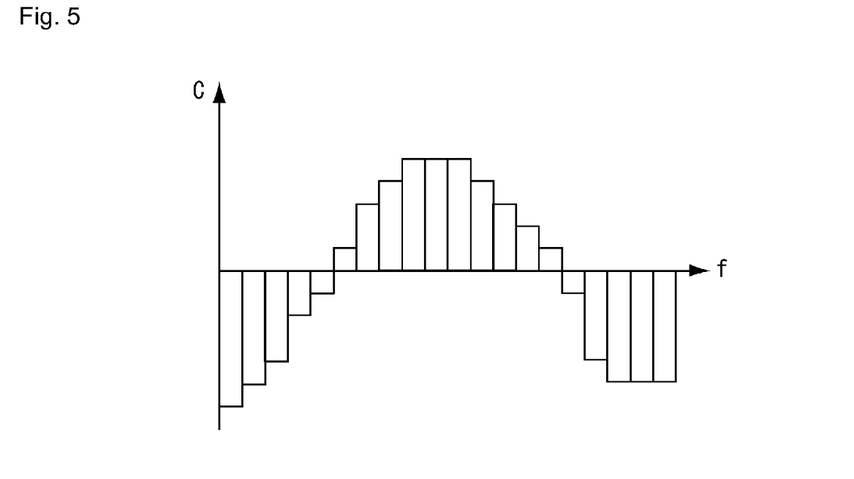
FIG. 5 illustrates an example of a reference table for calculating a likelihood of an object.

FIG. 5 illustrates an example of the table. Referring to FIG. 5, the likelihood is taken on a vertical axis C. The table is generated in the following manner.

A plurality of sample image patterns of an object to be recognized (in the present exemplary embodiment, an image of a person's face) and a plurality of sample image patterns of objects other than the recognition target object are provided. It is useful if ten thousand or more patterns are provided as each of the recognition target sample patterns and the recognition non-target sample patterns.

Further, the characteristic amount calculation unit 30 calculates the characteristic amount f based on each of the image patterns. The likelihood calculation unit 40 determines the location of the bin of the table to refer to based on the value of the characteristic amount f from among all the image patterns of the recognition target object (the face). In addition, the likelihood calculation unit 40 calculates distribution of frequency of the characteristic amount f as a face probability distribution $Pr(f|I_F)$. In the present exemplary embodiment, "$I_F$" denotes a face image pattern while "$Pr(f|I_F)$" denotes a probability distribution of the characteristic amount f of the face image pattern.

In addition, the likelihood calculation unit 40 determines the location of a bin of the table to refer to based on the value of the characteristic amount f of all the image patterns of the objects other than the recognition target object (the face) and calculates the distribution of frequency as a non-face probability distribution $Pr(f|I_{NF})$. In the present exemplary embodiment, "$I_{NF}$" denotes a non-face image pattern while "$Pr(f|I_{NF})$" denotes a probability distribution of the characteristic amount f of the non-face image pattern. The face likelihood C can be calculated by the following expression (2):

$$C = \log [\{Pr(f|IF)\}/\{Pr(f|INF)\}] \qquad \text{[Math. 2]}$$

Accordingly, it is useful to set a value of the likelihood C which is calculated by the expression (2) to the object dictionary for each bin of the characteristic amount f.

As described above, face recognition can be executed at high accuracy by using a plurality of characteristic amounts of characteristics of the face of a person in combination. In using the plurality of characteristic amounts in combination in calculating the likelihood, the likelihood calculation unit 40 calculates the likelihood of each of the plurality of characteristic amounts and sets the total sum of the likelihood values as the face likelihood. More specifically, the face likelihood C can be calculated by the following expression (3):

$$C = \sum_k Ck(fk) \qquad \text{[Math. 3]}$$

where "$f_k$" denotes a k-th characteristic amount and "$C_k(f_k)$" denotes the likelihood corresponding to the characteristic amount $f_k$.

In step S105, the object determination unit 50 determines whether the partial image clipped by the pattern extraction unit 20 is a recognition target object based on the likelihood of the object calculated by the likelihood calculation unit 40 in step S104.

More specifically, if it is determined that the face likelihood C that is calculated in step S104 is greater than a predetermined threshold value T, then the partial image pattern to be collated is determined as a face image. On the other hand, if it is determined that the face likelihood C is equal to or smaller than the predetermined threshold value T, the partial image pattern to be collated is determined as a non-face image.

In step S106, if it is determined that the partial image is the face image (YES in step S105), then the object determination unit 50, stores the location of the partial image in a storage unit (not illustrated) as a recognition result. On the other hand, if it is determined by the object determination unit 50 that the partial image is the non-face image (NO in step S105), then the processing returns to step S102. The processing in steps S102 through S106 is repeatedly and serially executed within the image as illustrated in FIG. 3.

Figure 6:
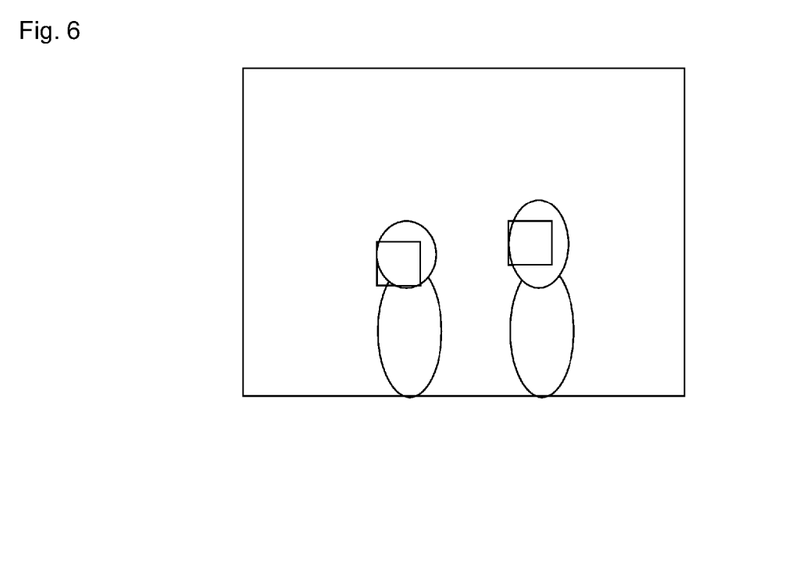
FIG. 6 illustrates an example of an output of a recognition result.

In step S107, the recognition result output unit 60 displays the recognition result (the location of the partial image that has been determined as the face image) stored on the storage unit (not illustrated) on a display as illustrated in FIG. 6. A rectangular portion in the example illustrated in FIG. 6 indicates a result of the face recognition which is displayed in superposition on the input image.

Now, the above described operation (2), i.e., the setting for recognizing a specific object belonging to a lower order category, will be described in detail below.

Figure 7:
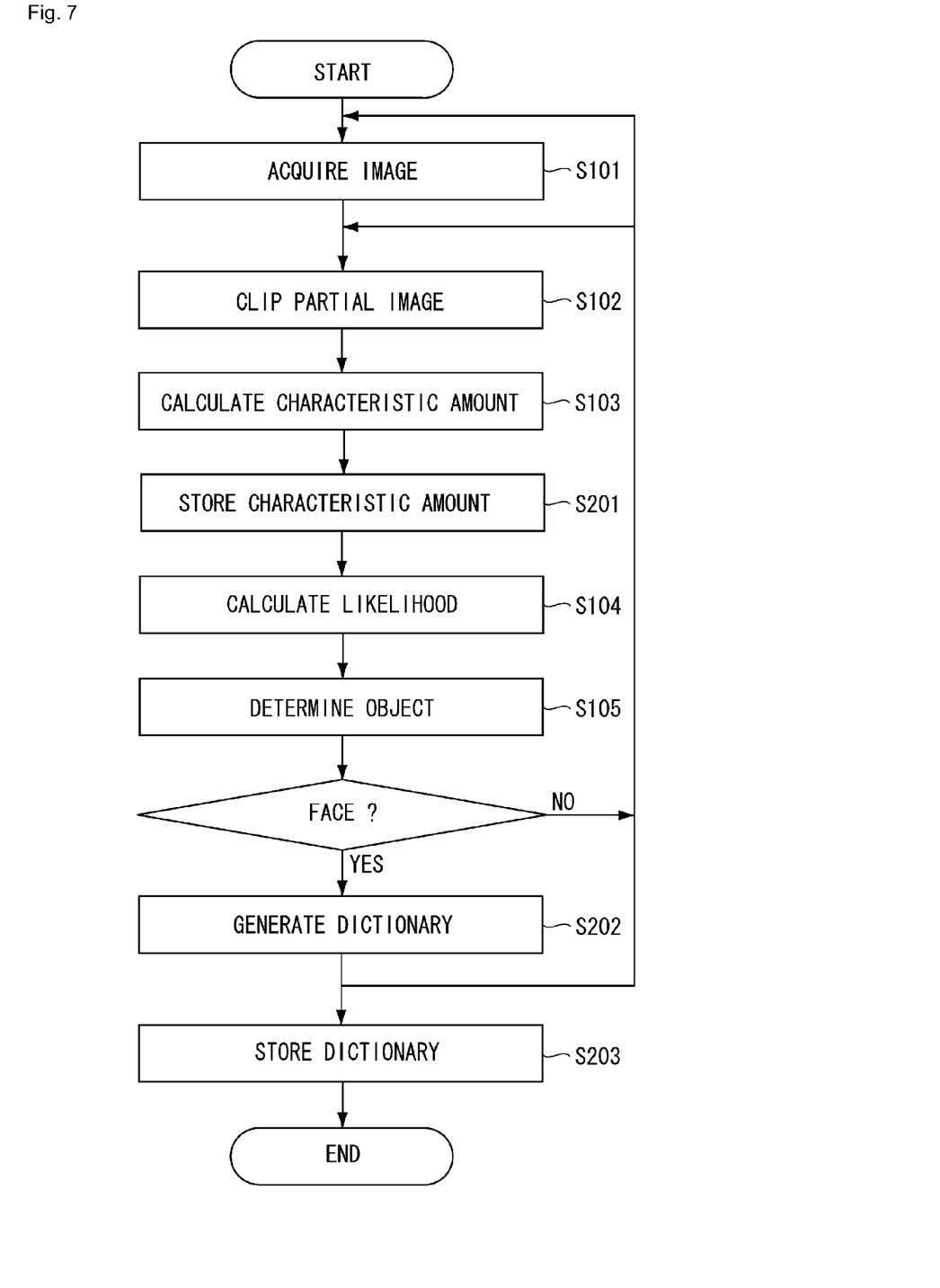
FIG. 7 is a flow chart illustrating an exemplary processing flow of a method for executing a setting for recognizing a specific object.

FIG. 7 is a flow chart illustrating an example of processing for executing a setting for recognizing a specific object that belongs to a lower order category. In the present exemplary embodiment, a method for recognizing a face of a specific person from an image will be described.

Referring to FIG. 7, in the method according to the present exemplary embodiment, in step S101, the image input unit 10 acquires data of an image captured by the imaging unit. In the present exemplary embodiment, it is supposed that the image input unit 10 acquires data of an image of the face of a specific person (e.g., a person A). The image data is stored on the image memory (not illustrated).

In step S102, the pattern extraction unit 20 loads the image data acquired in step S101 from the image memory and clips a partial image which is a target area of object recognition from the image data. In step S103, the characteristic amount calculation unit 30 calculates a characteristic amount which is used for recognizing the face of the specific person from the partial image clipped by the pattern extraction unit 20.

In step S201, the characteristic amount calculation unit 30 temporarily stores the calculated characteristic amount value on the storage unit (not illustrated).

In step S104, the likelihood calculation unit 40 calculates the likelihood of an object that is a target of the recognition based on the characteristic amount calculated by the characteristic amount calculation unit 30 and by using the object dictionary 100. In step S105, the object determination unit 50 determines whether the partial image clipped by the pattern extraction unit 20 is a recognition target object based on the likelihood of the object calculated by the likelihood calculation unit 40 in step S104.

If it is determined by the object determination unit 50 that the partial image is a face image (YES in step S105), then the processing advances to step S202. In step S202, the dictionary generation unit 200 generates a dictionary based on the characteristic amount temporarily stored in step S201. On the other hand, if it is determined by the object determination unit 50 that the partial image is the non-face image (NO in step S105), then the processing returns to step S102. The processing in steps S102 through S202 is repeatedly and serially executed within the image as illustrated in FIG. 3.

If the partial image that is determined as the non-face image or the partial image used in generating the dictionary is a last partial image of the image, then the processing returns to step S101. In step S101, the image input unit 10 acquires another image in which the face of the person A is captured and repeats the processing in steps S101 through S202.

By executing the above described method, the present exemplary embodiment can generate a dictionary exclusively including data of the image of the face of the person A by using the face image of a specific person (the person A).

More specifically, the likelihood calculation unit 40 determines a location of a bin of the table to refer to by using the characteristic amount f that is calculated based on the face image pattern of the person A which is stored in step S201. In addition, the likelihood calculation unit 40 calculates the distribution of frequency of the characteristic amount f of the image of the face of the person A as a face probability distribution $Pr(f|I_{FA})$.

In the present exemplary embodiment, "$I_{FA}$" denotes a face image pattern of the person A and "$Pr(f|I_{FA})$" denotes a probability distribution of the characteristic amount f of the face image pattern.

The face likelihood $C_A$ of the person A can be calculated by the following expression (4):

$$CA=\log\left[\{Pr(f|IFA)\}/\{Pr(f|INF)\}\right] \quad \text{[Math. 4]}$$

where "$Pr(f|I_{NF})$" denotes a probability distribution of the characteristic amount f of the non-face image pattern. Accordingly, it is useful to set a value of the likelihood $C_A$ which is calculated by the expression (4) to the object dictionary for each bin of the characteristic amount f.

In executing recognition by using a plurality of characteristic amounts in combination, it is useful to generate a dictionary for a specific person for each characteristic amount. By acquiring and using as many sample images of a specific person as possible, recognition of a specific person can be executed at high accuracy.

It is also useful if image processing, such as correction of image positional deviation by a predetermined amount, variable magnification, and luminance conversion, is executed on the partial image pattern that is determined as the face image in step S105, a plurality of partial face images is generated based on one partial face image, and a plurality of characteristic amounts is calculated and acquired.

However, if only a small number of samples of characteristic amount have been acquired, the accuracy of the probability distribution cannot become high. Accordingly, it is also useful if a probability distribution which is approximated by using a normal distribution calculated based on the acquired values of the characteristic amount is used in generating the dictionary.

Figure 8:
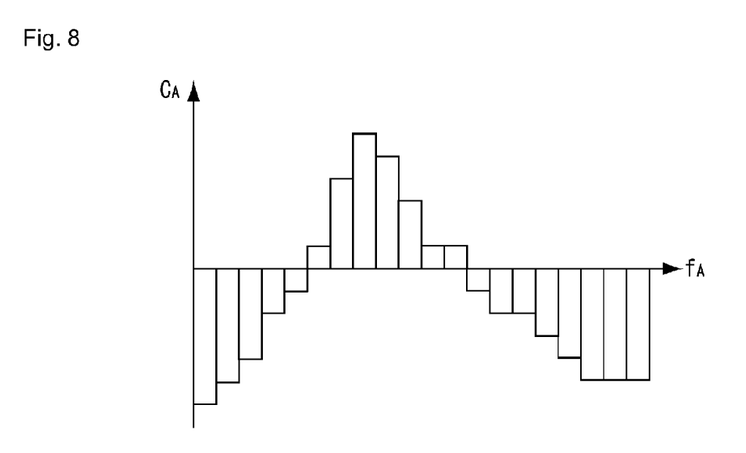
FIG. 8 illustrates an example of a reference table for calculating a likelihood of a specific object.

If the face of the person A is longer than a face of an average person, it is also useful if the table indicating the likelihood of the characteristic amount f has a distribution of the characteristic amount f biased to small values as illustrated in FIG. 8 compared to the face image table illustrated in FIG. 5.

In step S203, the control unit stores the specific object dictionary generated in step S202 on the specific object dictionary 110. After executing the above described processing, the processing for executing the setting for recognizing a specific object belonging to the lower order category ends.

Now, the operation (3), i.e., the method for recognizing a specific object belonging to the lower order category, will be described in detail below.

Figure 9:
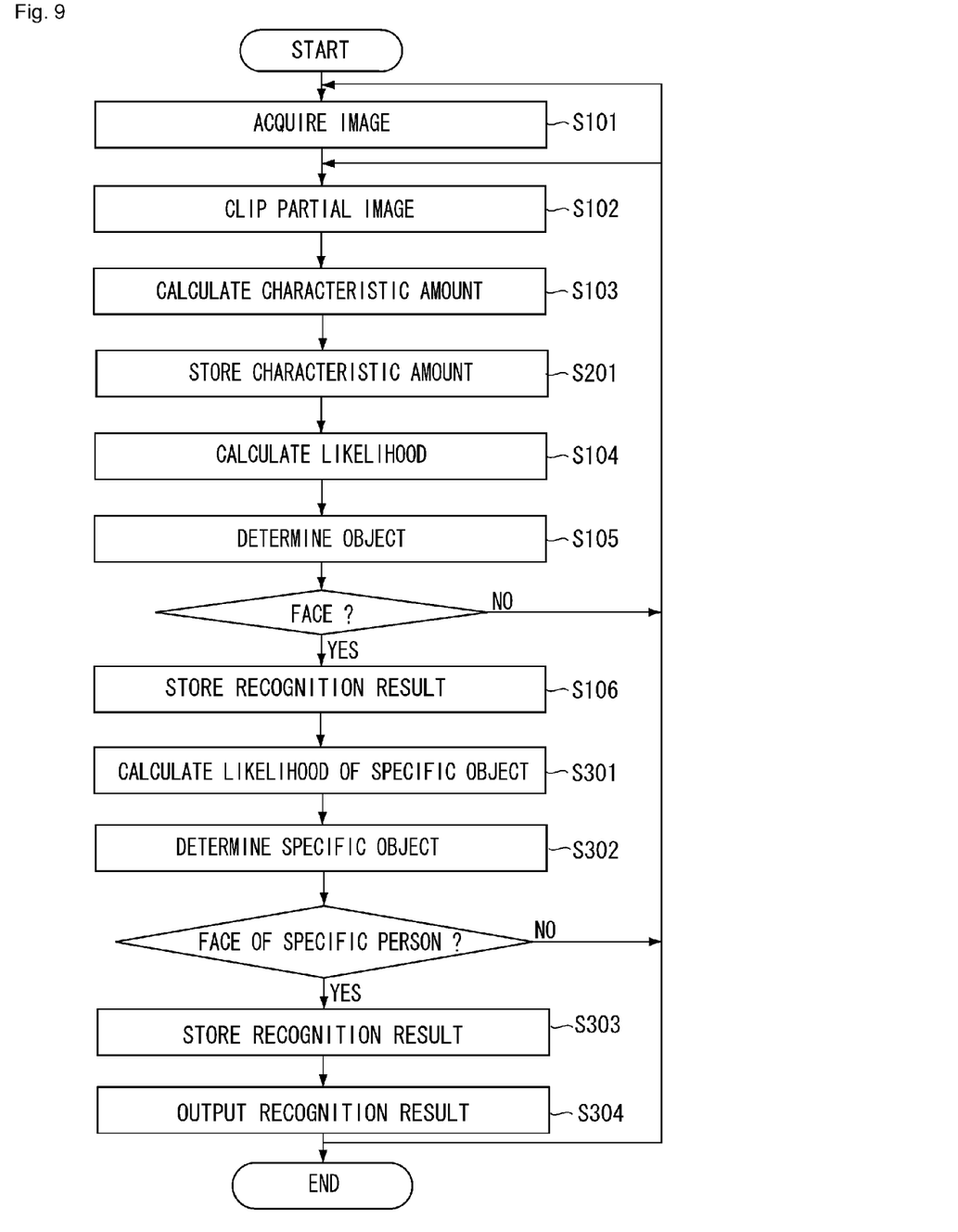
FIG. 9 is a flow chart illustrating an exemplary processing flow of a method for recognizing a specific object.

FIG. 9 is a flow chart illustrating an example of processing for recognizing a specific object belonging to the lower order category according to the setting in the dictionary for the specific object belonging to the lower order category.

In the processing illustrated in FIG. 9, in step S101, the image input unit 10 acquires data of an image captured by the imaging unit (not illustrated). In step S102, the pattern extraction unit 20 loads the image data acquired in step S101 from the image memory and clips a partial image which is a target area of object recognition from the image data as an input pattern.

In step S103, the characteristic amount calculation unit 30 calculates a characteristic amount which is used for recognizing a desired object from the partial image clipped by the pattern extraction unit 20. In step S201, the control unit (not illustrated) temporarily stores the value of the characteristic amount calculated by the characteristic amount calculation unit 30 on the storage unit (not illustrated).

In step S104, the likelihood calculation unit 40 calculates the likelihood of an object that is a target of the recognition based on the characteristic amount calculated by the characteristic amount calculation unit 30 and by using the previously stored object dictionary 100. In step S105, the object determination unit 50 determines whether the partial image clipped by the pattern extraction unit 20 is a recognition target object based on the likelihood of the object calculated by the likelihood calculation unit 40 in step S104. More specifically, the object determination unit 50 determines whether the partial image is an image of a person's face.

If it is determined by the object determination unit 50 that the partial image is a face image (YES in step S105), then the processing proceeds to step S106. In step S106, the control unit (not illustrated) stores the location of the face image on the storage unit (not illustrated) as a recognition result. On the other hand, if it is determined by the object determination unit 50 that the partial image is the non-face image (NO in step S105), then the processing returns to step S102.

In step S301, the likelihood calculation unit 40 calculates the likelihood of the recognition target object based on the characteristic amount temporarily stored in step S201 by using the specific object dictionary 110.

More specifically, in step S301, by using the likelihood corresponding to the value of the characteristic amount f is previously set in the specific object dictionary 110 (in the present exemplary embodiment, the dictionary for the image of the face of the person A) as a table, the likelihood calculation unit 40 determines the location of a bin of the table to refer to according to the value of the characteristic amount f and calculates the value stored in the determined bin as the likelihood.

In using a plurality of characteristic amounts in combination in calculating the likelihood, the likelihood calculation unit 40 calculates the likelihood of each of the plurality of characteristic amounts and sets the total sum of the likelihood values as the face likelihood. More specifically, the face likelihood $C_A$ of the person A can be calculated by the following expression (5):

$$CA = \sum_k CAk(fk) \quad \text{[Math. 5]}$$

where "$f_k$" denotes a k-th characteristic amount and "$C_{Ak}(f_k)$" denotes the likelihood corresponding to the characteristic amount $f_k$.

It is also useful if the characteristic amount calculated exclusively for the person A is highlighted for distinguishing from the distribution of the characteristic amount of the face of an average person. In this case, it is useful to assign weights to the likelihood of each characteristic amount based on the face likelihood by using the following expression (6):

$$CA = \sum_k wk * CAk(fk) \quad \text{[Math. 6]}$$

where $w_k = \{w^*C_k(f_k)\}^{-N}$, and w and N are constants.

In step S302, the object determination unit 50 determines whether the partial image clipped by the pattern extraction unit 20 is an image of a specific object according to the likelihood of the specific object calculated by the likelihood calculation unit 40.

More specifically, if it is determined that the likelihood of the face of the specific person $C_A$ which is calculated in step S301 is greater than a predetermined threshold value $T_A$ (YES in step S302), then it is determined that the pattern of the partial image to be collated is an image of the face of the person A. On the other hand, if it is determined that the likelihood of the face of the specific person $C_A$ is equal to or smaller than the predetermined threshold value $T_A$ (NO in step S302), then it is determined that the pattern of the partial image to be collated is not an image of the face of the person A.

If it is determined by the object determination unit 50 that the partial image is an image of the face of the specific person (YES in step S302), then the processing advances to step S303. In step S303, the control unit (not illustrated) stores the location of the partial image on the storage unit (not illustrated) as a recognition result. On the other hand, if it is determined by the object determination unit 50 that the partial image is not an image of the face of the specific person (NO in step S302), then the processing returns to step S102. The processing in steps S102 through S303 is executed on each of the partial images within the image as illustrated in FIG. 3.

Figure 10:
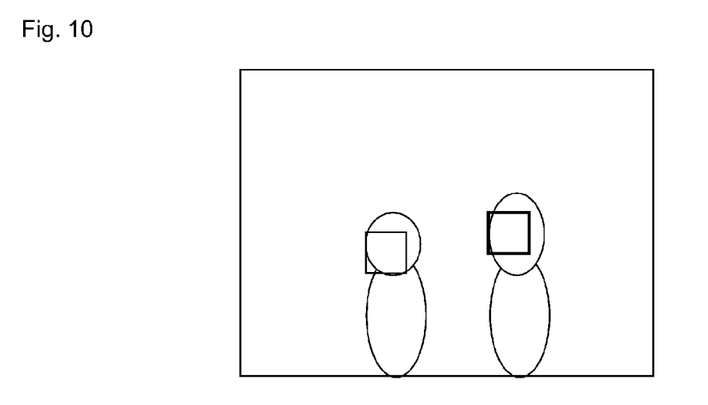
FIG. 10 illustrates an example of an output of a result of recognition of a person's face and a specific person's face.

In step S304, the recognition result output unit 60 displays the recognition result stored on the storage unit (not illustrated) in step S106 on a display as illustrated in FIG. 10.

In the example illustrated in FIG. 10, a rectangular portion drawn in thin lines indicates a result of the face recognition which is displayed in superposition on the input image while a rectangular portion drawn in thick lines indicates a result of recognizing the face of the specific person (the person A) which is displayed in superposition on the input image.

If the partial image that is determined as a non-face image, the partial image that is determined not to be an image of the face of a specific person, or the partial image whose recognition result is stored is a last partial image in the image, and if another image is to be processed, then the processing returns to step S101.

As described above, the present exemplary embodiment commonly uses the characteristic amount for recognizing an upper order category object in recognizing a lower order category object. Accordingly, the present exemplary embodiment can easily execute recognition of the upper order category object and the lower order category object without additionally executing complicated processing.

It is not necessary that a pattern recognition system according to the present exemplary embodiment includes only one apparatus, such as a camera. More specifically, it is also useful if the pattern recognition system according to the present exemplary embodiment includes two or more apparatuses (including a camera, a computer system, and the like).

It is also useful if a face image of a specific person is captured by a camera including a face recognition function and the captured face image of the specific person is output to a system including a recognition function and a dictionary generation function. In this case, the generated dictionary can be stored on the camera.

Figure 11:
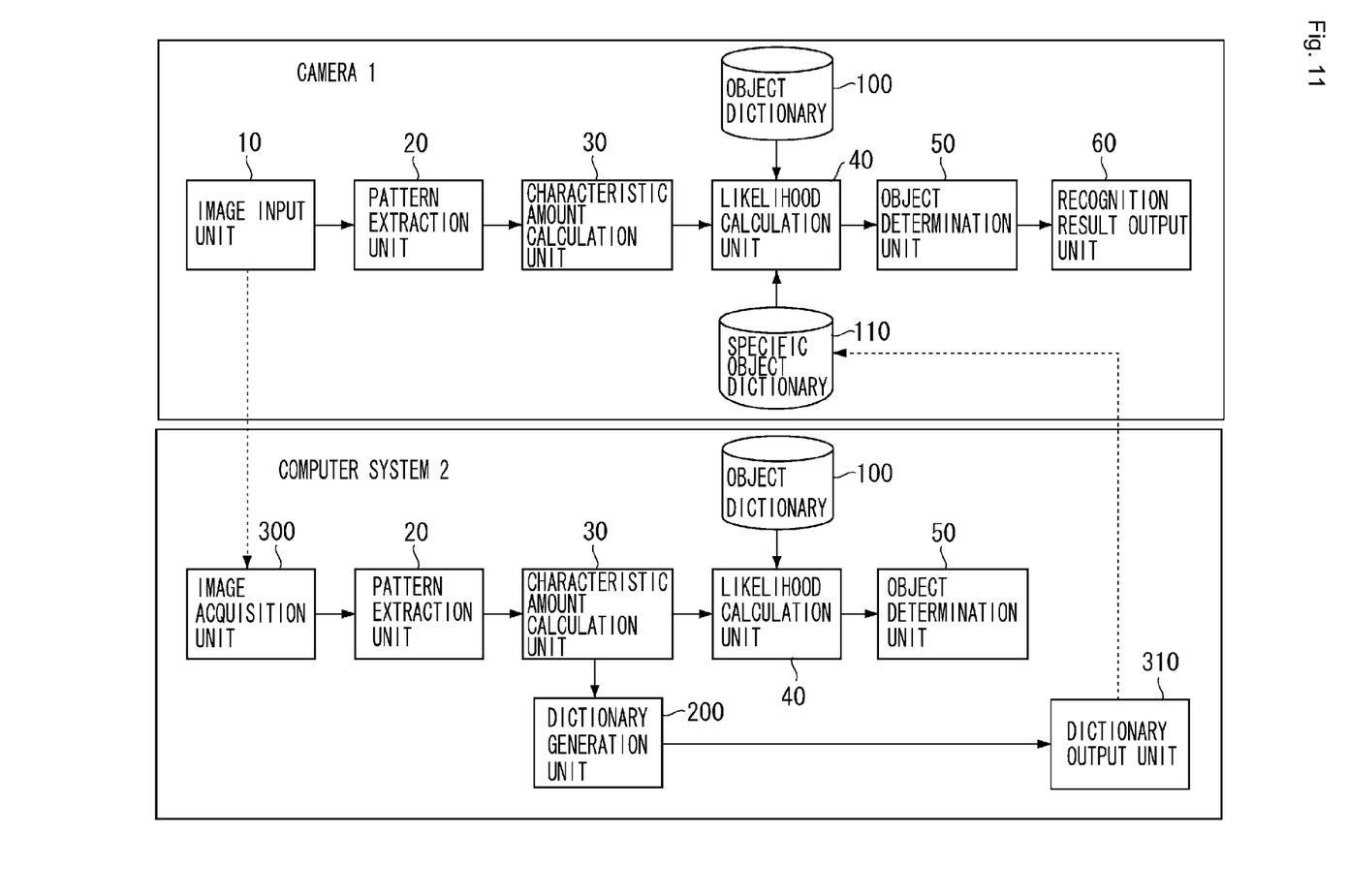
FIG. 11 illustrates another example of a configuration of the pattern recognition apparatus.

FIG. 11 illustrates an example of the above described configuration of the pattern recognition system. Referring to FIG. 11, the pattern recognition system includes a camera 1 and a computer system 2.

The camera 1 includes an image input unit 10, a pattern extraction unit 20, a characteristic amount calculation unit 30, a likelihood calculation unit 40, an object determination unit 50, a recognition result output unit 60, an object dictionary 100, and a specific object dictionary 110. The computer system 2 includes an image acquisition unit 300, a pattern extraction unit 20, a characteristic amount calculation unit 30, a likelihood calculation unit 40, an object determination unit 50, a dictionary generation unit 200, an object dictionary 100, and an object dictionary output unit 310.

The characteristic amount calculation unit 30 of each of the camera 1 and the computer system 2 calculates a characteristic amount used for recognizing an image of a person's face.

The object dictionary 100 of each of the camera 1 and the computer system 2 stores a characteristic of an object that is a target of face recognition.

The image acquisition unit 300 of the computer system 2 acquires image data from the image input unit 10 of the camera 1 via a storage medium, a communication medium, or the like (not illustrated). The object dictionary output unit 310 outputs information stored in the object dictionary generated by the dictionary generation unit 200 to the specific object dictionary 110 of the camera 1 via the storage medium, the communication medium, or the like (not illustrated). Other configurations of the pattern recognition system are similar to those illustrated in FIG. 1.

Now, an operation of the pattern recognition system having the above described configuration will be described in detail below. In executing a setting of processing for recognizing a face of a specific person, the camera 1 acquires a face image of the specific person by using the image input unit 10. The image captured by the camera 1 is transmitted to the image acquisition unit 300 of the computer system 2 via the storage medium (e.g., a CompactFlash (CF) card or a communication medium (e.g., a data communication cable, such as a universal serial bus (USB) cable).

The computer system 2 executes face recognition processing on the acquired image data by using the pattern extraction unit 20, the characteristic amount calculation unit 30, the likelihood calculation unit 40, and the object determination unit 50 for each partial image.

The dictionary generation unit 200 generates an object dictionary of the face of the specific person based on the characteristic amount of the pattern of the partial image that is determined as the face image of the specific person.

After that, the object dictionary output unit 310 outputs the generated object dictionary via the storage medium or the communication medium (not illustrated). The object dictionary is stored on the specific object dictionary 110 of the camera 1.

Subsequently, the camera 1 executes recognition processing based on the characteristic of the face image stored on the object dictionary 100 and the characteristic of the face image of the specific person stored on the specific object dictionary 110.

In the above described exemplary embodiment of the present invention, the dictionary generation unit 200 generates the specific object dictionary 110 for recognizing the lower order category object and recognition of the specific object is executed by using the specific object dictionary 110. However, the present invention is not limited to this configuration.

More specifically, it is useful if a dictionary to be used for recognizing a specific object is previously provided. In this case, the likelihood may be calculated by using the specific object dictionary based on the characteristic amount for recognizing the upper order category object to execute recognition of the specific object.

With the above described configuration also, the present invention can execute recognition of the upper order category object and recognition of the lower order category object without additionally executing complicated processing by commonly executing the recognition processing as much as possible.

The target of recognition is not limited to the face of a person. More specifically, if an object other than the face of a person is to be recognized, the present invention can execute recognition of the upper order category object and recognition of the lower order category object in combination.

In the exemplary embodiments of the present invention described above, the characteristic amount used in recognizing a predetermined object which is the upper order category object in determining whether the pattern of an input image is a pattern of the specific object. Therefore, the recognition of the upper order category object and the lower order category object can be executed with a simple configuration.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above described embodiments, and by a method, the steps of which are performed by a computer of a system or apparatus by, for example, reading out and executing a program recorded on a memory device to perform the functions of the above described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-114897 filed May 11, 2009, which is hereby incorporated by reference herein in its entirety.

The invention claimed is:

1. A pattern recognition apparatus comprising:
a memory;
a processor coupled to the memory which executes the following:
inputting partial images of an image;
calculating a characteristic amount of each of the partial images;
calculating a first likelihood as to whether each of the partial images is of an object of the predetermined category based on the characteristic amount by referring to a predetermined category dictionary which has been generated in advance based on a distribution of characteristic amounts of objects of a predetermined category;
determining whether each of the partial images is of an object of the predetermined category based on the first likelihood;
for a specific object which belongs to the predetermined category, inputting partial images of a learning image including the specific object, to determine whether each of the partial images is of an object of the predetermined category, to calculate a distribution of characteristic amounts of the partial images each of which is determined as the object of the predetermined category, and to generate a specific object dictionary for the specific object based on the distribution of the characteristic amount calculated for the object of the predetermined category in the image including the specific object;
calculating, if a partial image of an image to be recognized is input after the specific object dictionary has been generated and it is determined that the partial image is of the object of the predetermined category, to calculate a second likelihood as to whether the partial image is of the specific object based on the characteristic amount of each of the partial images by referring to the specific object dictionary; and determining whether the partial image is of the specific object based on the second likelihood, wherein determining a parameter for the specific object dictionary based on a distribution of characteristic amounts for partial images corresponding to the specific object and a distribution of characteristic amounts for partial images other than the predetermined object.

2. The pattern recognition apparatus according to claim 1, the processor further executes:

calculating a plurality of characteristic amounts based on an input pattern; calculating the first likelihood as to whether the input pattern is of the predetermined object for each characteristic amount calculated and calculating the first likelihood based on the likelihood for each characteristic amount, and calculating the second likelihood as to whether the input pattern is of the predetermined object for each characteristic amount calculated and calculating the second likelihood based on the likelihood for each characteristic amount.

3. The pattern recognition apparatus according to claim 1, wherein the predetermined object is a face of a person and the specific object is a face of a specific person.

4. A method for pattern recognition comprising:

inputting partial images of an image;

calculating a characteristic amount of each of the partial images;

generating a predetermined category dictionary based on a distribution of characteristic amounts of objects of a predetermined category;

calculating a first likelihood as to whether each of the partial images is of an object of the predetermined category based on the calculated characteristic amount by referring to an object a predetermined category dictionary which has been generated in advance based on a distribution of characteristic amounts of objects of a predetermined category;

determining whether each of the partial images is of an object of the predetermined category based on the first likelihood;

for a specific object which belongs to the predetermined category, inputting partial images of a learning image including the specific object, to determine whether each of the partial images is of an object of the predetermined category, to calculate a distribution of characteristic amounts of the partial images each of which is determined as the object of the predetermined category, and to generate a specific object dictionary for the specific object based on the distribution of the characteristic amount calculated for the object of the predetermined category in the image including the specific object;

calculating, if a partial image of an image to be recognized is input after the specific object dictionary has been generated and it is determined that partial image is of the object of the predetermined category, a second likelihood as to whether the partial image is of the specific object based on the calculated characteristic amount of each of the partial images by referring to a specific object dictionary which is generated based on a distribution of a characteristic amount of the specific object among the predetermined objects; and determining whether the partial image is of the specific object based on the second likelihood, wherein determining a parameter for the specific object dictionary based on a distribution of characteristic amounts for partial images corresponding to the specific object and a distribution of characteristic amounts for partial images other than the predetermined object.

5. A non-transitory computer-readable storage medium storing a computer-executable program for causing a computer to perform operations comprising:

inputting partial images of an image;

calculating a characteristic amount of each of the partial images;

calculating a first likelihood as to whether each of the partial images is of an object of the predetermined category based on the calculated characteristic amount by referring to a predetermined category dictionary which has been generated in advance based on a distribution of characteristic amounts of objects of a predetermined category;

determining whether each of the partial images is of an object of the predetermined category based on the first likelihood;

for a specific object which belongs to the predetermined category, inputting partial images of a learning image including the specific object, to determine whether each of the partial images is of an object of the predetermined category, to calculate a distribution of characteristic amounts of the partial images each of which is determined as the object of the predetermined category, and to generate a specific object dictionary for the specific object based on the distribution of the characteristic amount calculated for the object of the predetermined category in the image including the specific object;

calculating, if a partial image of an image to be recognized is input after the specific object dictionary has been generated and it is determined that the partial image is of the object of the predetermined category, a second likelihood as to whether the partial image is of the specific object based on the calculated characteristic amount of each of the partial images by referring to a specific object dictionary which is generated based on a distribution of a characteristic amount of the specific object among the predetermined objects; and determining whether the partial image is of the specific object based on the second likelihood, wherein determining a parameter for the specific object dictionary based on a distribution of characteristic amounts for partial images corresponding to the specific object and a distribution of characteristic amounts for partial images other than the predetermined object.

* * * * *